(12) United States Patent
Li et al.

(10) Patent No.: US 12,478,061 B2
(45) Date of Patent: Nov. 25, 2025

(54) METHOD, SYSTEM AND DEVICE FOR PROGRAMMED CELL FREEZING

(71) Applicant: UNIVERSITY OF SHANGHAI FOR SCIENCE AND TECHNOLOGY, Shanghai (CN)

(72) Inventors: Weijie Li, Shanghai (CN); Jing Shen, Shanghai (CN); Yanbin Qin, Shanghai (CN); Zhixin Li, Shanghai (CN); Hongli Yan, Shanghai (CN); Qin Qi, Shanghai (CN); Baolin Liu, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 500 days.

(21) Appl. No.: 18/043,108

(22) PCT Filed: May 25, 2022

(86) PCT No.: PCT/CN2022/094851
§ 371 (c)(1),
(2) Date: Feb. 27, 2023

(87) PCT Pub. No.: WO2022/247845
PCT Pub. Date: Dec. 1, 2022

(65) Prior Publication Data
US 2023/0309552 A1    Oct. 5, 2023

(30) Foreign Application Priority Data
May 27, 2021    (CN) .......................... 202110584162.4

(51) Int. Cl.
*A01N 1/162*    (2025.01)
*A01N 1/144*    (2025.01)

(52) U.S. Cl.
CPC ............. *A01N 1/162* (2025.01); *A01N 1/144* (2025.01)

(58) Field of Classification Search
CPC ....................................................... A01N 1/162
See application file for complete search history.

(56) References Cited

U.S. PATENT DOCUMENTS 5,003,787 A * 4/1991 Zlobinsky ............... F25D 17/02
62/99

OTHER PUBLICATIONS

Hunt 2019 Transfus Med Hemother vol. 46, pp. 134-149 (Year: 2019).*

* cited by examiner

*Primary Examiner* — Mark L Shibuya
(74) *Attorney, Agent, or Firm* — McClure, Qualey & Rodack, LLP (57) ABSTRACT

A method, system and device for programmed cell freezing is disclosed. The method includes: S1, acquiring a cooling rate k and a temperature distribution function $T=a \times h^2 + b \times h + c$ of a heat preservation chamber containing liquid nitrogen; S2, controlling a cell preservation tube to lower in the chamber at a speed of $v=(k-b)/2ah$, and acquiring temperatures $T_1$ and $T_2$ inside and outside the tube at a same time and at a same height in real time during the lowering of the tube; S3, determining whether a difference $\Delta t$ between $T_1$ and $T_2$ exceeds a preset temperature difference threshold, if yes, proceeding to S4, and if no, proceeding to S2 until the tube reaches a position corresponding to a preset temperature $T_0$; and S4, controlling the cell preservation tube to stop until the difference $\Delta t$ between $T_1$ and $T_2$ is less than or equal to the temperature difference threshold, and continuing S2.

8 Claims, 5 Drawing Sheets

METHOD, SYSTEM AND DEVICE FOR PROGRAMMED CELL FREEZING

CROSS REFERENCE TO RELATED APPLICATION

This application is a national stage of International Application No. PCT/CN2022/094851, filed on May 25, 2022, which claims priority to the Chinese Patent Application No. 202110584162.4, filed with the China National Intellectual Property Administration (CNIPA) on May 27, 2021, and entitled "METHOD, SYSTEM, EQUIPMENT, MEDIUM AND DEVICE FOR PROGRAMMED CELL FREEZING". Both of the aforementioned applications are incorporated herein by reference in their entireties.

TECHNICAL FIELD

The present disclosure relates to the technical field of cell freezing, and in particular, to a method, system and device for programmed cell freezing.

BACKGROUND

In recent years, with modern biomedicine moving towards an era of molecular medicine and individualized diagnosis and treatment, the demand for large-scale and high-quality biological specimens and related information resources has also increased dramatically. Many developed countries attach great importance to the protection and development of human genetic resources, establish various biological sample banks and population-based biological banks and virtual biological banks, and regard them as strategic initiatives to develop the core competitiveness in the field of biomedicine. Establishing biological cell resource banks and preserving biological cells (most of which are sperm cells, embryos or egg cells and stem cells at present) are of great significance for conservation, breeding and reproduction of species resources.

Programmed cooling has been widely used in cell cryopreservation as an effective cooling method, and liquid nitrogen fumigation is widely used because of its simple equipment. This method uses different gas layer temperatures on the surface of liquid nitrogen to pre-cool liquid nitrogen. When the pre-cooling is completed, samples are immersed in liquid nitrogen to complete the freezing.

However, because the surface temperature of liquid nitrogen is not fixed, the cooling rate and pre-cooling temperature of cell samples are inconsistent in the freezing process, resulting in different cell preservation effects.

SUMMARY

In view of the problem that a cooling rate is inconsistent with a pre-cooling temperature in a process of programmed cell freezing in the prior art, an objective of embodiments of the present disclosure is to provide a method, system and device for programmed cell freezing.

To achieve the above objective, the technical solution of the present disclosure is as follows.

In a first aspect, the present disclosure provides a method for programmed cell freezing, including the following steps:

S1, acquiring a cooling rate k and a temperature distribution function $T=a \times h^2+b \times h+c$ of a heat preservation chamber containing liquid nitrogen, where h is a distance from a temperature measuring point to an upper edge of the heat preservation chamber, T is a temperature at the temperature measuring point, and a, b, c are constants;

S2, controlling a cell preservation tube to lower in the heat preservation chamber at a real-time speed of $v=(k-b)/2ah$, and acquiring temperatures $T_1$ and $T_2$ inside and outside the cell preservation tube at a same time and at a same height in real time during the lowering of the cell preservation tube;

S3, determining whether a difference $\Delta t$ between $T_1$ and $T_2$ exceeds a preset temperature difference threshold, if yes, proceeding to S4, and if no, proceeding to S2 until the cell preservation tube is controlled to reach a position corresponding to a preset heat preservation temperature $T_0$; and S4, controlling the cell preservation tube to stop until the difference $\Delta t$ between $T_1$ and $T_2$ is less than or equal to the temperature difference threshold, and proceeding to S2.

Optionally, in S2, acquiring the temperature $T_1$ includes:

arranging a reference tube at a same height as the cell preservation tube;

putting a reference solution with same thermophysical properties as liquid in the cell preservation tube in the reference tube, or putting same liquid as the liquid in the cell preservation tube in the reference tube; and acquiring a temperature of the liquid in the reference tube by a temperature measuring element as the temperature $T_1$.

Optionally, in S3, the position $h_0$ corresponding to the preset heat preservation temperature $T_0$ is calculated by the temperature distribution function $T=a \times h^2+b \times h+c$ of the heat preservation chamber.

Optionally, in S3, the cell preservation tube is controlled to reach the position corresponding to the preset heat preservation temperature $T_0$ through following steps:

comparing $T_1$ acquired in real time with $T_0$ to determine whether $T_1$ is less than $T_0$, if yes, controlling the cell preservation tube to continue lowering, and if no, controlling the cell preservation tube to stop.

Optionally, the method further includes S5 after the cell preservation tube is controlled to reach the position corresponding to the preset heat preservation temperature $T_0$ in S3.

S5, after waiting for a preset heat preservation time, controlling the cell preservation tube to raise in the heat preservation chamber until the cell preservation tube is removed from the heat preservation chamber.

In a second aspect, the present disclosure provides a system for programmed cell freezing. The system is configured to implement the method described above, and the system includes:

an acquiring module configured to obtain the cooling rate k, the temperature distribution function of the heat preservation chamber, temperatures $T_1$ and $T_2$ inside and outside the cell preservation tube at the same time and at the same height, a preset heat preservation temperature $T_0$, a preset temperature difference threshold, and a preset heat preservation time;

a determination module configured to determine whether the difference $\Delta t$ between $T_1$ and $T_2$ exceeds the preset temperature difference threshold, and whether the cell preservation tube reaches a position corresponding to the preset heat preservation temperature $T_0$; and a lifting control module configured to generate a lifting command according to a determination result of the determination module, so as to control a lifting device to drive the cell preservation tube to raise and lower in the heat preservation chamber through the lifting command.

In a third aspect, the present disclosure provides a device for programmed cell freezing, including:

a base;

a heat preservation chamber disposed on the base and containing liquid nitrogen;

a tube rack provided with a cell preservation tube;

at least two temperature measuring elements configured to measure temperatures inside and outside the cell preservation tube at a same time and at a same height, respectively;

a lifting device disposed on the base and including an output end fixedly connected to the tube rack to carry the tube rack up and down in the heat preservation chamber; and a control device including an electronic device electrically connected to at least two temperature measuring elements and the lifting device, where the electronic device includes a memory storing an executable program code and a processor coupled with the memory; and the processor calls the executable program code stored in the memory to implement the method described above.

Optionally, the device further includes a reference tube. The reference tube is fixedly disposed on the tube rack, and the reference tube is arranged at a same height as the cell preservation tube. The temperature measuring element is arranged in the reference tube to indirectly acquire the temperature inside the cell preservation tube.

According to the specific embodiments of the present disclosure, the present disclosure discloses the following technical effects.

The present disclosure provides a method, system and device for programmed cell freezing. In the process of controlling the cell preservation tube to lower in the heat preservation chamber containing liquid nitrogen, the temperatures inside and outside the cell preservation tube are acquired continuously to ensure that a difference of the temperatures inside and outside the cell preservation tube is always lower than the preset temperature difference threshold in the lowering process. The cell preservation tube is stopped lowering when the temperature difference exceeds the temperature difference threshold, and continues lowering when the temperature difference is lower than the temperature difference threshold until the position of the preset heat preservation temperature is reached, which can effectively improve the cell preservation effect in the process of programmed freezing, and solve the problem of poor cell preservation effect caused by the inconsistency between the cooling rate and the pre-cooling temperature in the process of programmed cell freezing in the prior art.

BRIEF DESCRIPTION OF THE DRAWINGS

To describe the technical solutions of the present disclosure more clearly, the following briefly describes the accompanying drawings required for describing the embodiments or the prior art. Apparently, the accompanying drawings in the following description merely show some embodiments of the present disclosure, and those of ordinary skill in the art may still derive other accompanying drawings from these accompanying drawings without creative efforts.

Description of reference numerals: 1—control device, 2—display screen, 3—heat preservation chamber, 4—tube rack, 5—reference tube, 6—cell preservation tube, 7—first temperature measuring element, 8—second temperature measuring element, 9—bent arm, 10—slider, 11—screw, 12—guide rail, 13—motor, and 14—base.

DETAILED DESCRIPTION OF THE EMBODIMENTS

The specific implementations of the present disclosure are further described below with reference to the accompanying drawings. It should be noted here that the description of these implementations is used to help understand the present disclosure, but does not constitute a limitation to the present disclosure. Further, the technical features involved in the various implementations of the present disclosure described below may be combined with each other as long as they do not constitute a conflict with each other.

It should be noted that in the description of the present disclosure, orientations or position relationships indicated by terms such as "upper", "lower", "left", "right", "front", and "rear" are descriptions of the structure of the present disclosure based on the drawings. These terms are merely used to facilitate description of the present disclosure and simplify the description, rather than to indicate or imply that the mentioned apparatus or element must have a specific orientation and must be constructed and operated in a specific orientation. Therefore, these terms should not be understood as a limitation to the present disclosure.

The terms "first" and "second" in this technical solution are only used to distinguish the same or similar structures, or corresponding structures with similar functions, not to imply the importance arrangement of these structures, nor to rank these structures or compare the sizes of these structures or other meanings.

In addition, unless otherwise clearly specified and limited, terms such as "installation" and "connection" should be understood in a broad sense. For example, a connection may be a fixed connection, a detachable connection or an integrated connection. A connection may be a mechanical connection or an electrical connection. A connection may be a direct connection or an indirect connection via an intermediate medium. A connection may be intercommunication between two structures. Those of ordinary skill in the art may understand specific meanings of the above terms in the present disclosure according to the general idea of the present disclosure and the specific context of the technical solution.

Embodiment I

Figure 1:
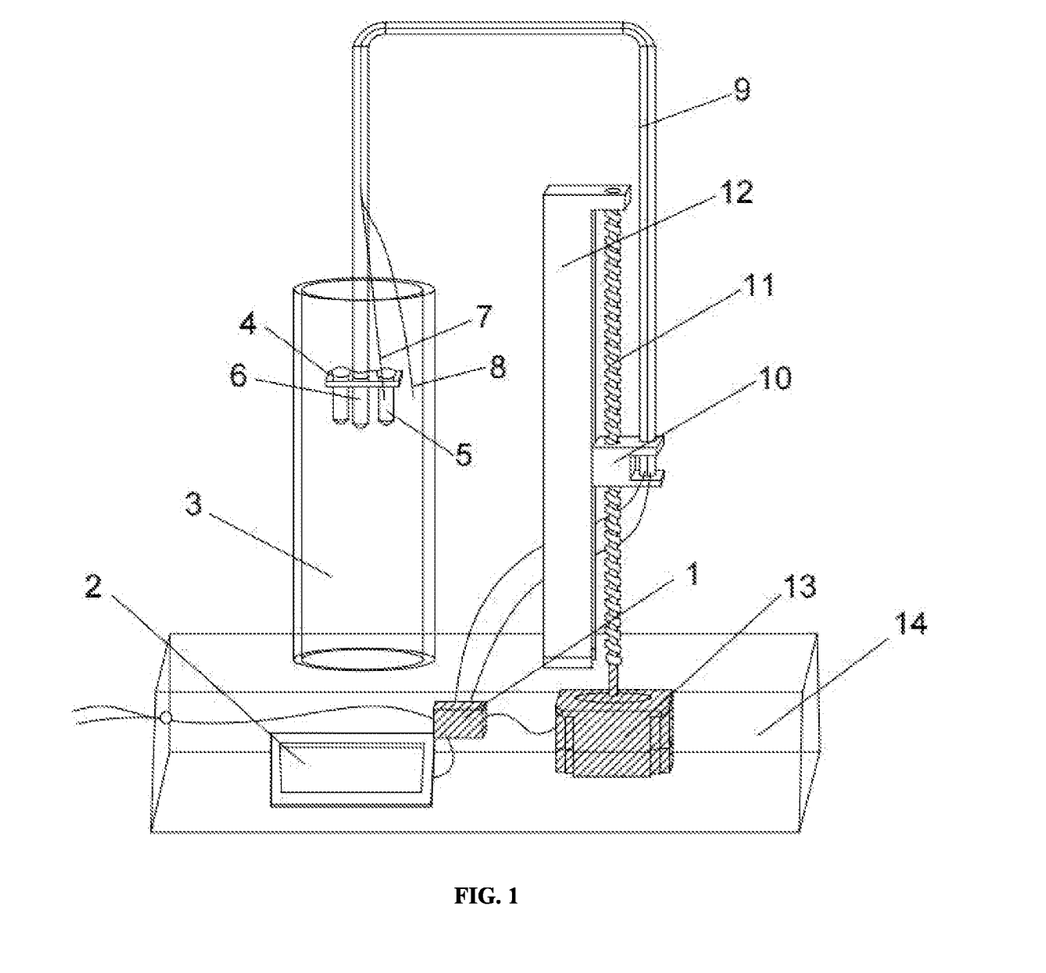
FIG. 1 is a schematic structural diagram of a device for programmed cell freezing according to embodiments of the present disclosure.

This embodiment provides a device for programmed cell freezing, as shown in FIG. 1, including a control device 1, a heat preservation chamber 3, a tube rack 4, a cell preservation tube 6, temperature measuring elements, a lifting device, and a base 14.

The base 14 is configured as a platform and installed on the desktop when in use. The heat preservation chamber 3 is configured as a cylindrical structure made of materials with low thermal conductivity (such as foaming materials), a top of which is provided with an opening. Alternatively, the heat preservation chamber 3 may also be configured as a vacuum cup. The heat preservation chamber 3 contains liquid nitrogen, and the liquid level of the liquid nitrogen is usually at a certain distance from an upper edge of the heat preservation chamber 3, such as 10 cm. In addition, temperature distribution above the liquid level of the heat preservation chamber 3 meets a temperature distribution function $T=a \times h^2+b \times h+c$, where h is a distance from a temperature measuring point to the upper edge of the heat preservation chamber 3, T is a temperature at the temperature measuring point, and a, b, c are constants and are obtained through experiments.

In the experiment, liquid nitrogen is injected in a heat preservation chamber, after liquid level is stable for 10 min, temperatures T at different distances h from upper edge of the heat preservation chamber are measured by a thermocouple, and a temperature distribution function fitting T and h is $T=a \times h^2+b \times h+c$, where a is a temperature distribution correction coefficient (unit: $K \cdot cm^{-2}$), b is a temperature distribution coefficient (unit: $K \cdot cm^{-1}$), and c is a final temperature (unit: K), representing temperature at the upper edge of heat preservation chamber. For example, a=0.0024, b=−1.306, c=−50.192.

Table 1 shows experiment data of T and h.

TABLE 1

Experiment data of T and h

| h (cm) | T (K) |
| --- | --- |
| 90 | −187.6 |
| 85 | −176.4 |
| 80 | −167.3 |
| 75 | −162.4 |
| 70 | −160.3 |
| 65 | −144.7 |
| 60 | −137.8 |
| 55 | −136.6 |
| 50 | −116.1 |
| 45 | −109.5 |
| 40 | −103.3 |
| 35 | −97.1 |
| 30 | −90.4 |
| 25 | −87.7 |
| 20 | −78.8 |
| 15 | −72.7 |
| 10 | −64.4 |
| 5 | −54.3 |

The cell preservation tube 6 is configured to load to-be-frozen cells, and the cell preservation tube 6 is fixedly installed on the tube rack 4, such that the tube rack 4 can carry the cell preservation tube 6 up and down in the heat preservation chamber 3, for performing programmed cooling. The lifting device was disposed on the base 14 and includes an output end fixedly connected to the tube rack 4 to carry the tube rack 4 up and down in the heat preservation chamber 3. In this embodiment, the lifting device is configured to include an electric push rod and a bent arm 9. The electric push rod is vertically installed on the base 14, while the bent arm 9 includes one end fixed on an output end of the electric push rod and the other end fixedly connected to the tube rack 4. As shown in FIG. 1, the electric push rod includes a slider 10, a screw 11, a guide rail 12, and a motor 13. The guide rail 12 is vertically arranged and fixed on the base 14. The screw 11 is parallel to the guide rail 12, and upper and lower ends of the screw 11 are rotatably connected to a horizontal plate at a top of the guide rail 12 and the base 14 through bearings. The motor 13 is fixed on the base 14, and an output shaft of the motor 13 is connected to a lower end of the screw 11 through a coupling or a gear transmission mechanism. The slider 10 is slidably connected to the guide rail 12, and the slider 10 is provided with a threaded hole engaged with the screw 11, such that after started, the motor 13 drives the screw 11 to rotate, then the screw 11 drives the slider 10 to raise and lower, and the bent arm 9 carries the tube rack 4 and the cell preservation tube 6 installed thereon up and down in the heat preservation chamber 3. Alternatively, in another embodiment, the lifting device can also be configured as a cylinder, a cylinder body of which is fixedly installed on the base 14 and an output end of which is used for fixing of the bent arm 9.

In addition, temperatures inside and outside the cell preservation tube 6 are measured by temperature measuring elements. For example, in this embodiment, the temperature measuring elements include a first temperature measuring element 7 and a second temperature measuring element 8. Both the first temperature measuring element 7 and the second temperature measuring element 8 are selected as thermocouples. A probe of the first temperature measuring element 7 extends into an interior of the cell preservation tube 6 to acquire the temperature inside thereof, while a probe of the second temperature measuring element 8 is located outside the cell preservation tube 6 to acquire the temperature outside thereof, and the probe of the first temperature measuring element 7 and the probe of the second temperature measuring element 8 are located at the same height. It can be understood that at least two temperature measuring elements are configured so as to acquire temperatures inside and outside the cell preservation tube 6 at the same time, respectively. However, in order to improve the accuracy of temperature measurement, multiple temperature measuring elements can also be configured to reduce an error of single-side single-point measurement.

The control device 1 includes an electronic device. The electronic device includes a memory storing an executable program code and a processor coupled with the memory. In addition, the processor is also electrically connected to the above temperature measuring elements and the lifting device. The processor calls the executable program code stored in the memory to implement the steps of the method for programmed cell freezing carried by the executable program code.

In use, first, according to the structure of the heat preservation chamber 3, its temperature distribution function $T=a \times h^2+b \times h+c$ can be obtained in advance through experiments. The to-be-frozen cells and the necessary cell protective agent are placed into the cell preservation tube 6. A real-time lowering speed $v=(k-b)/2ah$ of the cell preservation tube 6 is obtained according to the required cooling rate k, where k represents the cooling rate, h is a distance from a temperature measuring point to the upper edge of the heat preservation chamber 3, and both a and b are constants. The lifting device is controlled by the control device 1 to drive the tube rack 4 and the cell preservation tube 6 fixed thereon to lower at such speed, and h can be calculated from the rotation angle of the motor 13. Temperatures of the first temperature measuring element 7 and the second temperature measuring element 8 are compared in the lowering process to obtain a temperature difference, so as to ensure that the difference is lower than the preset temperature difference threshold. When the difference reaches the temperature difference threshold, the lowering of the cell preservation tube 6 is stopped by the control device 1, such that temperature data measured by the first temperature measuring element 7 reaches a freezing temperature. It can be seen that the device according to the embodiment can monitor the programmed cell freezing process in real time and make rapid adjustments according to the monitored results, thus improving the freezing effect.

In a preferred embodiment, the control device 1 is also configured to include a display screen 2. The display screen 2 is electrically connected to the processor in the control device 1, and preferably, the display screen 2 is a touch screen, such that control parameters (the cooling rate k, the temperature difference threshold, etc.) can be input and modified through the display screen 2.

Example II

The difference between Embodiment II and Embodiment I is that in Embodiment II, as shown in FIG. 1, a reference tube 5 is also included. The reference tube 5 is fixedly disposed on the tube rack 4, and the reference tube 5 is arranged at a same height as the cell preservation tube 6. In use, the reference tube 5 is filled with reference solution with the same volume and thermophysical properties (including crystallization enthalpy, thermal conductivity, and specific heat capacity) as the liquid in the cell preservation tube 6, or is directly filled with a liquid the same as the liquid in the cell preservation tube 6 and with an equal volume. In addition, a temperature measuring element (that is, the first temperature measuring element 7) is arranged in the reference tube 5, such that the temperature measured by the first temperature measuring element 7 is taken as the temperature inside the cell preservation tube 6 in indirect measurement way. Further, the first temperature measuring element 7 arranged inside cell preservation tube 6 in Embodiment I is eliminated.

Such arrangement can avoid the influence of temperature measurement on the to-be-frozen cells, thus further improving the cell freezing effect.

Embodiment III

This embodiment provides a method for programmed cell freezing. The method is implemented based on the above device in Embodiment I. The method can be implemented by the above electronic device in the above device, and implements steps shown in FIG. 2. Specific steps include step S1-S4.

Figure 2:
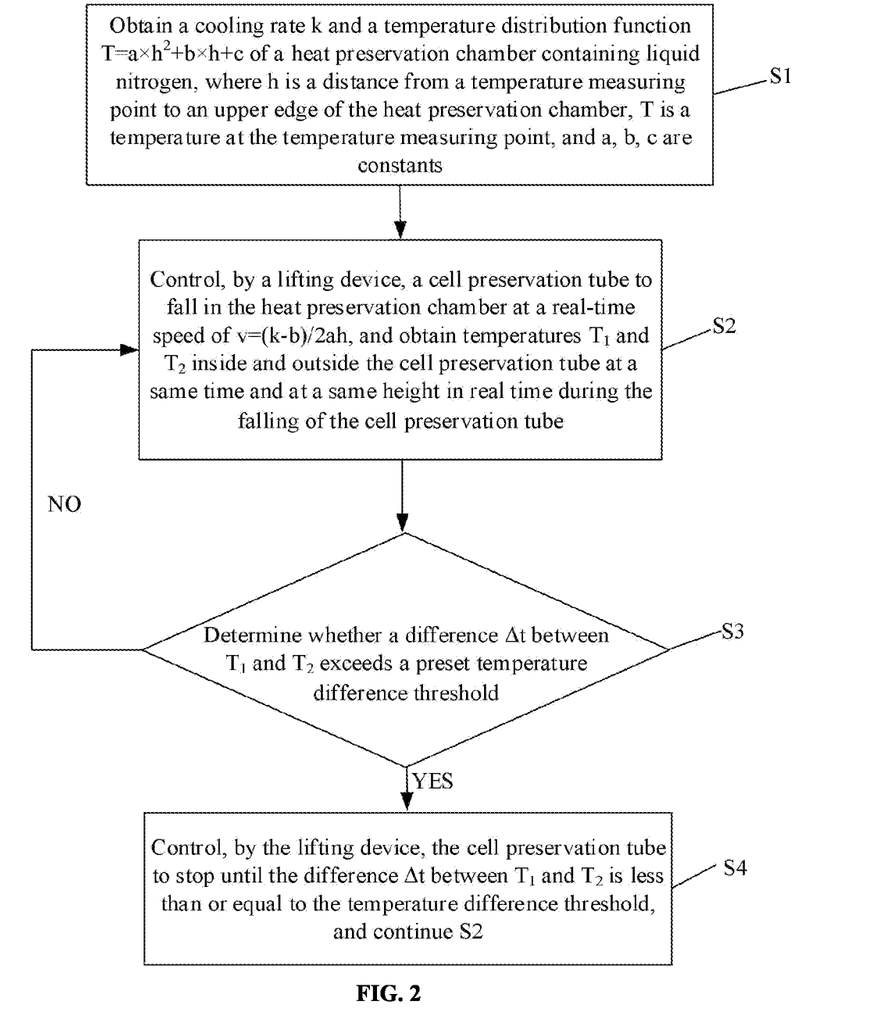
FIG. 2 is a flow chart of a method for programmed cell freezing according to embodiments of the present disclosure.

In step S1, the cooling rate k and the temperature distribution function $T=a\times h^2+b\times h+c$ of the heat preservation chamber 3 containing liquid nitrogen are acquired, where h is a distance from a temperature measuring point to an upper edge of the heat preservation chamber 3, T is a temperature at the temperature measuring point, and a, b, c are constants.

In step S2, the cell preservation tube 6 is controlled by the lifting device to lower in the heat preservation chamber 3 at a real-time speed of $v=(k-b)/2ah$, and temperatures $T_1$ and $T_2$ inside and outside the cell preservation tube 6 at a same time and at a same height are acquired in real time during the lowering of the cell preservation tube 6.

In step S3, whether a difference Δt (absolute value) between $T_1$ and $T_2$ exceeds the preset temperature difference threshold is determined, if yes, the method proceeds to S4, and if no, the method proceeds to S2 until the cell preservation tube 6 reaches a position corresponding to a preset heat preservation temperature $T_0$.

The position $h_0$ corresponding to the preset heat preservation temperature $T_0$ can be calculated by the temperature distribution function $T=a\times h^2+b\times h+c$ of the heat preservation chamber 3. Alternatively, it can be obtained by the following steps: comparing $T_1$ acquired in real time with $T_0$ to determine whether $T_1$ is less than $T_0$, if yes, the cell preservation tube 6 is controlled by the lifting device to continue lowering, and if no, the cell preservation tube 6 is controlled by the lifting device to stop.

In step S4, the cell preservation tube 6 is controlled by the lifting device to stop until the difference Δt (absolute value) between $T_1$ and $T_2$ is less than or equal to the temperature difference threshold, the process proceeds S2.

For example, when the method according to the embodiment is applied to sperm freezing, the following steps are performed. First, 2 ml of healthy sperm is taken from three volunteers and liquefied naturally in a 37° C. incubator. Second, the sperm motility is initially detected with a sperm counting plate under a microscope, each sample is repeatedly detected twice. 200 sperms are counted each detection. The two detection values are compared until the error percentage of the two detection values is within an acceptable range, otherwise the detection samples are prepared again and detected again. Third, the sperm grading method is as follows: grade a: rapid progress; grade b: slow progress; grade c: swing in place; and grade d: not moving. The forward motile sperm cryopresuscitationrate (hereinafter referred to as sperm cryopresuscitation rate) is calculated as follows: sperm cryopresuscitation rate=(percentage of grade a sperm after freezing+percentage of grade b sperm after freezing)/(percentage of grade a sperm before freezing+percentage of grade b sperm before freezing). Fourth, the sperm and a commercially available sperm protective solution are mixed at 1:1, and put into the cell preservation tube 6 for freezing. Fifth, the first temperature measuring element 7 and the second temperature measuring element 8 are installed, and the mixed solution is frozen according to the above steps. The specific procedure is as follows: the temperature of the mixed solution is reduced at a cooling rate of 10 K/min to −80° C., hold for 20 min, thereby completing pre-freezing of the mixed solution; and then, the temperature of the mixed solution is continuously reduced at 10 K/min until the mixed solution is immersed into-196° C. liquid nitrogen for freezing for 2 weeks.

In addition, a control group is set up and frozen by an artificial liquid nitrogen fumigation method. That is, a cryopreservation tube containing sperm and protective solution is placed at a position 10 cm away from the surface of liquid nitrogen, and hold for 10 min, and the cryopreservation tube is immersed in liquid nitrogen for 2 weeks and taken out.

The sperm after freezing is thawed in warm water at 37° C. After thawing, the sperm cryopresuscitation rate is calculated again. The results are shown in Table 1. It can be seen that the resuscitation rate of cells frozen by the method of this embodiment is higher than that of cells frozen by the artificial liquid nitrogen fumigation method.

TABLE 1

Resuscitation rates of different sperm freezing methods (different superscripts representing significant differences, P < 0.05)

| Group | Resuscitation rate % | | | |
|---|---|---|---|---|
| | Group 1 | Group 2 | Group 3 | Group 4 |
| Artificial group | 57.9 | 49.6 | 53.2 | 53.6[a] |
| Automatic group | 59.3 | 52.4 | 55.7 | 55.8[b] |

Embodiment IV

Figure 3:
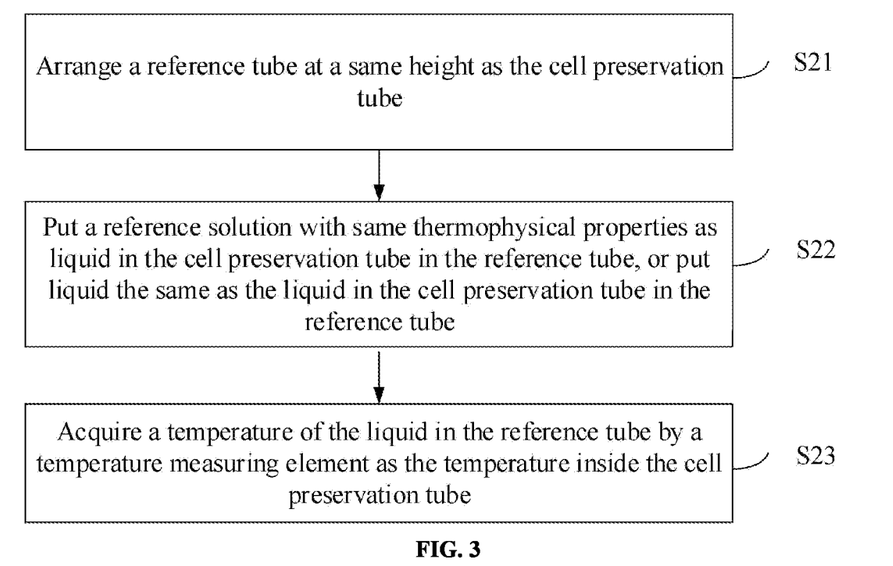
FIG. 3 is a flow chart of a method for acquiring a temperature inside a cell preservation tube in the method for programmed cell freezing according to embodiments of the present disclosure.

The difference between Embodiment IV and Embodiment III is that in Embodiment IV, in step S2, the temperature $T_1$ inside the cell preservation tube 6 is not directly acquired, but indirectly acquired through the following steps S21 to S23, as shown in FIG. 3.

In step S21, a reference tube 5 is arranged at a same height as the cell preservation tube 6.

In step S22, a reference solution with same thermophysical properties as liquid in the cell preservation tube 6 is contained in the reference tube 5, or the same liquid as the liquid in the cell preservation tube 6 is contained in the reference tube 5. For example, it is preferred to add an equal volume of an artificial seminal plasma mixture into the reference tube 5.

In step S23, a temperature of the liquid in the reference tube 5 is acquired by a temperature measuring element as the temperature $T_1$ inside the cell preservation tube 6.

Embodiment V

Figure 4:
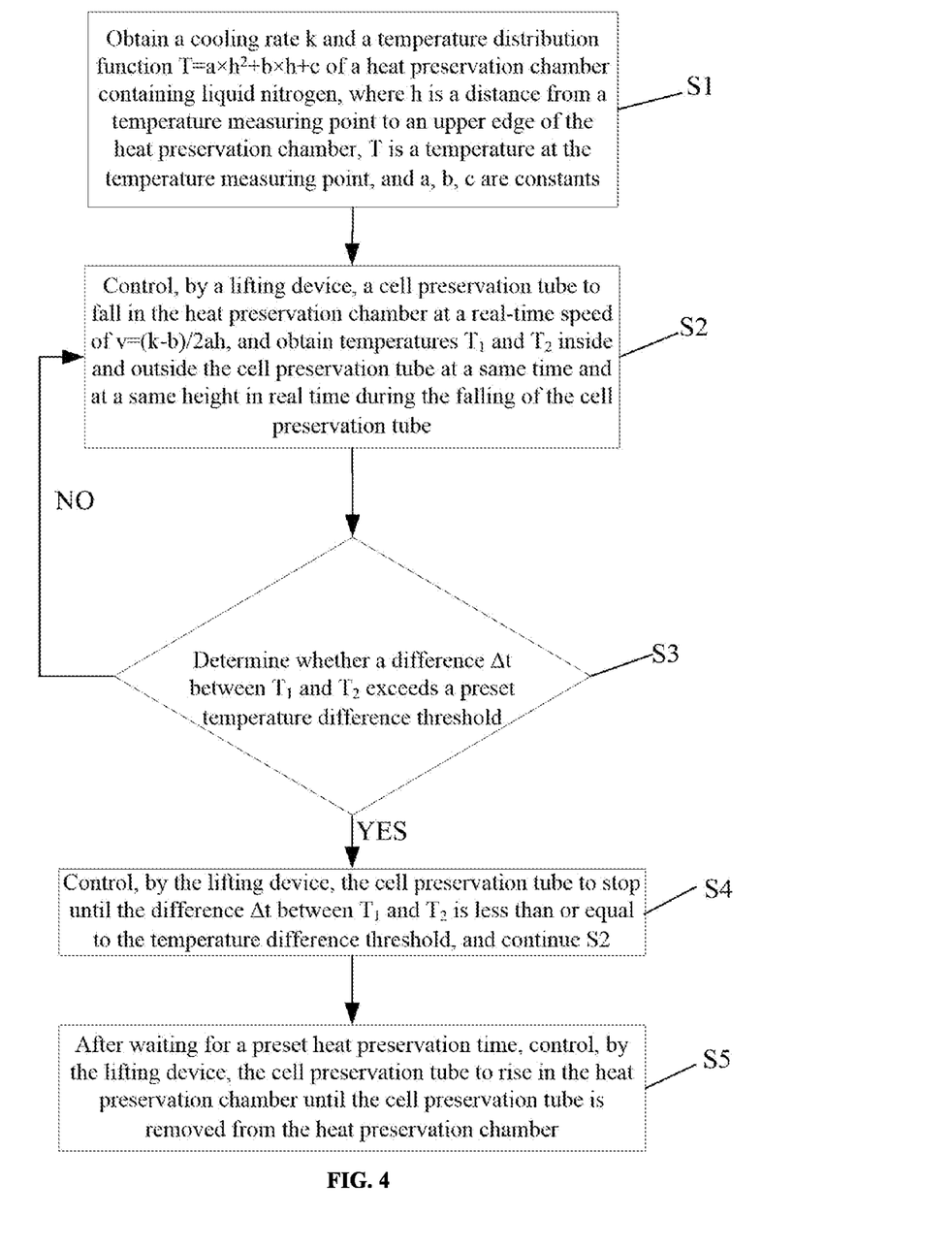
FIG. 4 is a flow chart of another method for programmed cell freezing according to embodiments of the present disclosure.

The difference between Embodiment V and Embodiment III is that in Embodiment V, step S5 is further included after the cell preservation tube 6 reaches the position of the preset heat preservation temperature $T_0$ in step S3, as shown in FIG. 4.

In Step S5, after waiting for a preset heat preservation time, the cell preservation tube 6 is controlled by the lifting device to raise in the heat preservation chamber 3 until the cell preservation tube is removed from the heat preservation chamber 3.

Embodiment VI

Figure 5:
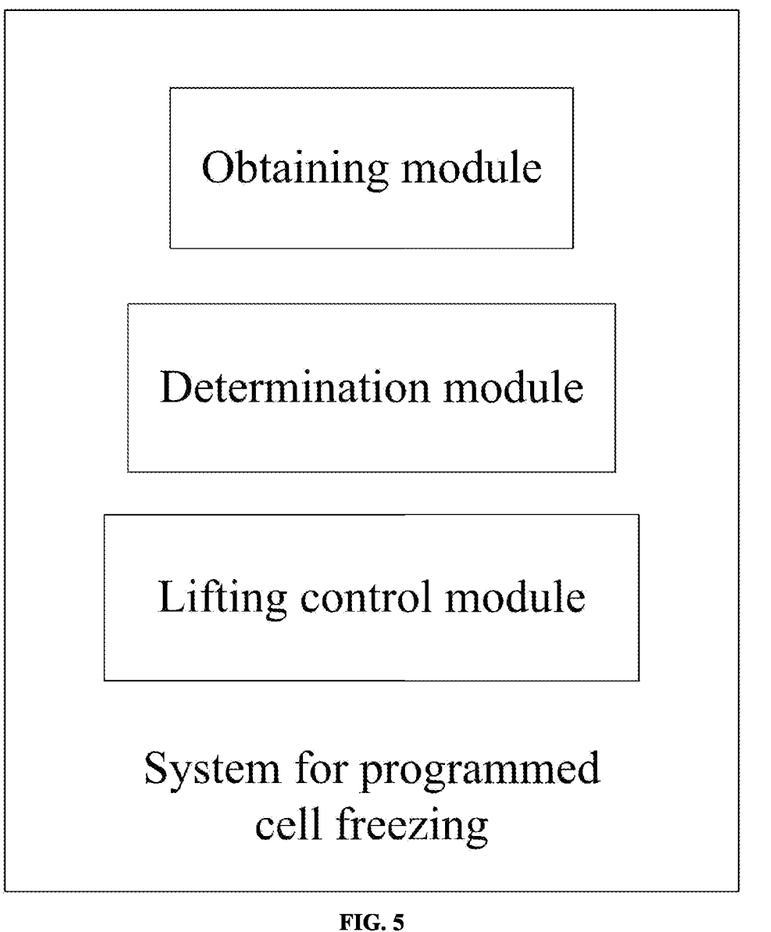
FIG. 5 is a schematic structural diagram of a system for programmed cell freezing according to embodiments of the present disclosure.

This embodiment provides a system for programmed cell freezing. The system was configured to implement the method of the above embodiments. As shown in FIG. 5, the system includes: an acquiring module, a determination module, and a lifting control module.

The acquiring module is configured to acquire the cooling rate k, the temperature distribution function of the heat preservation chamber 3, the temperature $T_1$ inside the cell preservation tube 6 and the temperature $T_2$ outside the cell preservation tube 6 at the same time and at the same height, the preset heat preservation temperature $T_0$, the preset temperature difference threshold, and the preset heat preservation time.

The determination module is configured to determine whether the difference $\Delta t$ between $T_1$ and $T_2$ exceeds the preset temperature difference threshold, and whether the cell preservation tube 6 reaches the position of the preset heat preservation temperature $T_0$. It is easy to understand that the difference value $\Delta t$ in the above embodiments is an absolute value.

The lifting control module is configured to generate a lifting command according to a determination result of the determination module, so as to control a lifting device to drive the cell preservation tube 6 to raise and lower in the heat preservation chamber 3 through the lifting command.

The present disclosure is described with reference to the flowcharts and/or block diagrams of the method, the device (system), and the computer program product according to the embodiments of the present disclosure. It should be understood that each flow and/or each block in the flowcharts and/or the block diagrams and a combination of a flow and/or a block in the flowcharts and/or the block diagrams may be implemented by computer program instructions. These computer program instructions may be provided to a general-purpose computer, a dedicated computer, an embedded processor, or a processor of other programmable data processing device to generate a machine, so that the instructions executed by a computer or a processor of other programmable data processing device generate an apparatus for implementing functions specified in one or more flows in the flowcharts and/or in one or more blocks in the block diagrams.

These computer program instructions may be stored in a computer-readable memory that can instruct the computer or other programmable data processing device to work in a specific manner, so that the instructions stored in the computer-readable memory generate an artifact that includes an instruction apparatus. The instruction apparatus implements functions specified in one or more flows in the flowcharts and/or in one or more blocks in the block diagrams.

These computer program instructions may be loaded onto a computer or other programmable data processing device, so that a series of operations and steps are performed on the computer or other programmable device to produce a computer-implemented process. Therefore, the instructions executed on the computer or other programmable device provide steps for implementing the function specified in one or more flows in the flowcharts and/or in one or more blocks in the block diagrams.

The implementations of the present disclosure are described in detail above in combination with the accompanying drawings, but the present disclosure is not limited thereto. For those skilled in the art, various changes, modifications, replacements, and variations made to the implementations without departing from the principle and spirit of the present disclosure still lower within the protection scope of the present disclosure.

What is claimed is:

1. A method for programmed cell freezing of biological cells in a cell preservation tube, comprising:
    (S1) acquiring a cooling rate k and a temperature distribution function $T=a \times h^2 + b \times h + c$ of a heat preservation chamber containing liquid nitrogen, wherein h is a distance from a temperature measuring point to an upper edge of the heat preservation chamber, T is a temperature at the temperature measuring point, a is a temperature distribution correction coefficient, b is a temperature distribution coefficient, and c is a final temperature representing temperature at an upper edge of the heat preservation chamber;
    (S2) controlling a cell preservation tube containing biological cells to lower in the heat preservation chamber at a real-time speed of $v=(k-b)/2ah$, and acquiring temperatures $T_1$ and $T_2$ inside and outside the cell preservation tube, respectively, at a same time and at a same height in real time during the lowering of the cell preservation tube;

(S3) determining whether a difference Δt between $T_1$ and $T_2$ exceeds a preset temperature difference threshold, if yes, proceeding to S4, and if no, proceeding to S2 until the cell preservation tube is controlled to reach a position corresponding to a preset heat preservation temperature $T_0$; and (S4) controlling the cell preservation tube to stop the lowering until the difference Δt between $T_1$ and $T_2$ is less than or equal to the temperature difference threshold, and thereafter proceeding to S2.

2. The method according to claim 1, wherein in S2, the acquiring the temperature $T_1$ comprises:
arranging a reference tube at a same height as the cell preservation tube;
putting a reference solution with same thermophysical properties as liquid in the cell preservation tube in the reference tube, or putting same liquid as the liquid in the cell preservation tube in the reference tube; and
acquiring a temperature of the liquid in the reference tube by a temperature measuring element as the temperature $T_1$.

3. The method according to claim 1, wherein in S3, the position $h_0$ corresponding to the preset heat preservation temperature $T_0$ is calculated by the temperature distribution function $T=a \times h^2 + b \times h + c$ of the heat preservation chamber.

4. The method according to claim 1, wherein in S3, the cell preservation tube is controlled to reach the position corresponding to the preset heat preservation temperature $T_0$ through following step:
comparing $T_1$ acquired in real time with $T_0$ to determine whether $T_1$ is less than $T_0$, if yes, controlling the cell preservation tube to continue lowering, and if no, controlling the cell preservation tube to stop.

5. The method according to claim 1, further comprising S5 after the cell preservation tube is controlled to reach the position corresponding to the preset heat preservation temperature $T_0$ in S3:
S5, after waiting for a preset heat preservation time, controlling the cell preservation tube to raise in the heat preservation chamber until the cell preservation tube is removed from the heat preservation chamber.

6. A system for programmed cell freezing, wherein the system is configured to implement the method according to claim 1, and the system comprises:
an acquiring module, configured to obtain the cooling rate k, the temperature distribution function of the heat preservation chamber, the temperatures $T_1$ and $T_2$ inside and outside the cell preservation tube at the same time and at the same height, the preset heat preservation temperature $T_0$, the preset temperature difference threshold, and the preset heat preservation time;
a determination module, configured to determine whether the difference Δt between $T_1$ and $T_2$ exceeds the preset temperature difference threshold, and whether the cell preservation tube reaches the position corresponding to the preset heat preservation temperature $T_0$; and
a lifting control module, configured to generate a lifting command according to a determination result of the determination module, so as to control a lifting device to drive the cell preservation tube to raise and lower in the heat preservation chamber through the lifting command.

7. A device for programmed cell freezing, comprising:
a base;
a heat preservation chamber, disposed on the base and configured to contain liquid nitrogen;
a tube rack, provided with a cell preservation tube;
at least two temperature measuring elements, configured to measure temperatures inside and outside the cell preservation tube at a same time and at a same height, respectively;
a lifting device, disposed on the base and comprising an output end fixedly connected to the tube rack to carry the tube rack up and down in the heat preservation chamber; and
a control device, having an electronic device electrically connected to the at least two temperature measuring elements and the lifting device, wherein
the electronic device having a memory storing an executable program code and a processor coupled with the memory; and the processor being configured to call the executable program code stored in the memory to implement the method according to claim 1.

8. The device for programmed cell freezing according to claim 7, further comprising a reference tube, wherein the reference tube is fixedly disposed on the tube rack, and the reference tube is arranged at a same height as the cell preservation tube; and the temperature measuring element is arranged in the reference tube to indirectly acquire the temperature inside the cell preservation tube.

* * * * *